United States Patent [19]
St. Clair

[11] Patent Number: 4,835,200

[45] Date of Patent: May 30, 1989

[54] COLOR STABLE HOT MELT ADHESIVE

[75] Inventor: David J. St. Clair, Houston, Tex.

[73] Assignee: Shell Oil Company, Houston, Tex.

[21] Appl. No.: 943,403

[22] Filed: Dec. 19, 1986

[51] Int. Cl.$^4$ .......................... C08K 5/11; C08K 5/13; C08K 5/34; C08K 5/52

[52] U.S. Cl. .................... 524/100; 524/109; 524/132; 524/151; 524/153; 524/289; 524/291; 524/332; 524/343; 524/349; 524/505; 525/98; 525/99; 604/366

[58] Field of Search .............. 524/100, 151, 109, 153, 524/132, 289, 291, 332, 343, 349; 525/98, 99

[56] References Cited

U.S. PATENT DOCUMENTS

| | | | |
|---|---|---|---|
| 4,444,953 | 4/1984 | St. Clair | 524/505 |
| 4,514,554 | 4/1985 | Hughes et al. | 525/99 |
| 4,526,577 | 7/1985 | Schmidt, Jr. et al. | 604/366 |
| 4,699,938 | 10/1987 | Minamizaki et al. | 525/98 |
| 4,714,749 | 12/1987 | Hughes et al. | 525/98 |

FOREIGN PATENT DOCUMENTS 31743  3/1976  Japan .................. 524/153

*Primary Examiner*—John Kight
*Assistant Examiner*—Kriellion Morgan

[57] ABSTRACT

A hot melt adhesive composition possessing color stability and resistance to heat degradation, oxidation and skin formation. The adhesive composition contains a block copolymer prepared using a bromide based coupling agent, a tackifying resin, and an effective amount of a stabilizer composition. The stabilizer composition contains a thio compound, a phenolic antioxidant, a tris-(nonylated phenyl) phosphite, and an aliphatic compatible epoxy compound. Optionally, the adhesive composition may also contain a plasticizer and/or a petroleum derived wax.

20 Claims, No Drawings

COLOR STABLE HOT MELT ADHESIVE

BACKGROUND OF THE INVENTION

The present invention relates to hot melt adhesives, and more particularly to a heat stable, color stable hot melt adhesive useful for product assembly applications such as a multi-line adhesive used in the construction of disposable diapers, sanitary napkins and bed pads.

While a wide range of uses for hot melt adhesive compositions are known throughout the disposable article industry, it has been found that a hot melt adhesive used for bonding in a particular use or application may be completely unsuitable for other uses or applications. Thus, various hot melt adhesive compositions have been proposed for use in the construction of disposable articles. Depending upon the type of construction employed, the adhesive must possess certain physical properties. Perhaps the most stringent properties are those required of adhesives to be used in the bonding of polyethylene films, or the like, to tissue or non-woven substrates in the production of articles, particularly diapers, sanitary napkins and bed pads, using multi-line construction techniques. This class of disposable construction presents unique problems for the adhesive formulator. The adhesive must possess a high degree of adhesion since it is applied in the form of a number of very fine parallel longitudinal stripes thus requiring each line of adhesive to possess exceptionally high bonding properties. The adhesive must also possess sufficient adhesive and cohesive strength to provide high bond strength values when subjected to stress so the constructions cannot be easily separated. As an additional criterion, it is necessary that the adhesive, upon application, not absorb throughout the actual disposable construction and that the adhesive bonds not only remain secure but also be flexible even after prolonged periods of storage.

Though an adhesive composition may satisfy all the above criteria, the adhesive composition may still prove undesirable from an aesthetic and practical point of view. Aesthetically, the adhesive composition utilized must be substantially white or clear in color. Otherwise, the stripes of adhesive will be particularly noticeable and unsightly in the disposable article which is generally composed of clear and white components.

On a practical level, the adhesive must possess resistance to heat degradation, oxidation and skin formation during the construction phase of these disposable articles. During this phase, the hot melt adhesives are sometimes held molten and exposed to air for several days at temperatures near 175° C. in the adhesive application equipment. Additionally, the adhesive may be remelted one or more times during this period of days. Adhesive stability in this very severe environment is of major concern, especially if the adhesive contains unsaturated polymer components which tend to be thermally unstable.

An indication of degradation is skin formation on the surface of the adhesive. Such skin formation poses a serious problem to the adhesive application equipment. Specifically, during agitation, the skin tends to fragment and flake into the molten adhesive. These flakes of skin, thereafter, tend to clog the nozzles which finally apply the adhesive onto the disposable article. At a minimum, the clogging may produce articles which do not meet specifications, but eventually call for a maintenance shutdown of the manufacturing line to unclog these nozzles.

As briefly alluded to above, polymers form a substantial portion of the adhesive composition. Particularly, block copolymers have been increasingly employed in adhesive compositions primarily due to their high cohesive strengths and their ability to "crosslink" without a chemical vulcanization step. These block copolymers, such as described in Harlan, U.S. Pat. No. 3,239,478, are primarily either linear or radial styrene/butadiene or styrene/isoprene block copolymers. The linear copolymers typically have the structure styrene-butadiene-styrene (SBS) or styrene-isoprene-styrene (SIS). The high cohesive strength of these styrene/diene block copolymers primarily results from their well-known domain formation.

However, the polymerization process utilized for forming these block copolymers commonly employs a brominated polyfunctional coupling agent, which produces a brominated residue. These residues are suspected of causing a color instability in the adhesive composition during molten aging. The color instability manifests itself as a developing and thereafter darkening brown color with the passage of time, thereby turning a clear or hazy white adhesive to a translucent dark brown color.

It has now been found that a particular combination of particular antioxidants, stabilizers and halide scavengers can be be employed in adhesive compositions containing block copolymers formed using brominated polyfunctional coupling agents and results in a degradation resistant, color stable adhesive composition useful in multi-line construction of disposable articles such as diapers, sanitary napkins and bed pads.

SUMMARY OF THE INVENTION

According to the present invention, there is provided a hot melt adhesive composition possessing color stability and resistance to heat degradation, oxidation and skin formation. The adhesive composition comprises a block copolymer prepared using a bromine based coupling agent, a tackifying resin and an amount of a stabilizer composition effective to impart the above referenced color stability and resistance to heat degradation, oxidation and skin formation to the adhesive composition. The stabilizer composition comprises a thio compound, a phenolic antioxidant, a tris-(nonylated phenyl) phosphite, and an aliphatic compatible epoxy compound. Optionally, the adhesive composition may also contain a plasticizer and/or a petroleum derived wax.

More particularly, there is provided a hot melt adhesive composition which is color stable and resistant to heat degradation, oxidation and skin formation comprising:
(a) 100 parts of an unstabilized adhesive composition, said unstabilized adhesive composition comprising:
  (1) about 15 to about 35 percent by weight of a block copolymer, said block copolymer being prepared utilizing a bromide based coupling agent, said block copolymer comprising at least two monoalkenyl arene polymer end blocks A and at least one elastomeric conjugated diene polymer mid block B, and said block copolymer having about 8 to about 65 percent by weight of said monoalkenyl arene polymer block content, each polymer block A having an average molecular weight of between about 5,000 and about 125,000, and each polymer block B having an average molecular weight of between about 10,000 and about 300,000,
(2) about 45 to about 70 percent by weight of a compatible tackifying resin,
(3) 0 to about 30 percent by weight of a plasticizing oil, and
(4) 0 to about 15 percent of a petroleum derived wax; and
(b) an effective amount of a stabilizer package, said effective amount consisting essentially of:
(1) from about 0.03 to about 2.0 parts per hundred parts of said unstabilized adhesive compositon (phua) of a thio compound, said thio compound being 2,4-bis-(n-octylthio)-6-(4-hydroxy-3,5-di-tertiary-butyl anilino)-1,3,5-triazine,
(2) from about 0.15 to about 5.0 phua of a phenolic antioxidant,
(3) from about 0.13 to about 5.0 phua of a tris-(nonylated phenyl) phosphite, and
(4) from about 0.30 to about 5.0 phua of an aliphatic compatible epoxy compound.

There is further provided a stablizer composition for use in hot melt adhesive compositions so as to impart color stability and resistance to heat degradation, oxidation and skin formation to said adhesive composition, said adhesive composition utilizing block copolymers prepared using a bromide based coupling agent, said stabilizer composition consisting essentially of:
(a) from about 0.03 to about 2.0 phua of a thio compound, said thio compound being 2,4-bis-(n-octylthio)-6-(4-hydroxy-3,5-di-tertiary-butyl anilino)-1,3,5-triazine;
(b) from about 0.15 to about 5.0 phua of a phenolic antioxidant;
(c) from about 0.13 to about 5.0 phua of a tris-(nonylated phenyl) phosphite; and
(d) from about 0.30 to about 5.0 phua of an aliphatic compatible epoxy compound.

DETAILED DESCRIPTION OF THE INVENTION

A. Block Copolymer

The block copolymers employed herein may have a variety of geometrical structures, since the invention does not depend on any specific geometrical structure, but rather upon the chemical constitution of each of the polymer blocks and of the coupling agents utilized. The block copolymers employed in the present composition are thermoplastic elastomers and have at least two monoaklenyl arene polymer end blocks A and at least one elastomeric conjugated diene polymer mid block B. The number of blocks in the block copolymer is not of special importance and the macromolecular configuration may be linear, graft, radial or star depending upon the method by which the block copolymer is formed. Typical block copolymers of the most simple configuration would have the structure polystyrene-polybutadiene-polystyrene (S-B-S) and polystyrene-polyisoprene-polystyrene (S-I-S). A typical radial or star polymer would comprise one in which the diene block has three or four branches (radial) or five or more branches (star), the tip of each branch being connected to a polystyrene block.

It will be understood that both blocks A and B may be either homopolymer, random or tapered copolymer blocks as long as each block predominates in at least one class of the monomers characterizing the blocks defined hereinbefore. Thus, blocks A may comprise styrene/alpha-methylstyrene copolymer blocks or styrene/butadiene random or tapered copolymer blocks as long as the blocks individually predominate in monoalkenyl arenes. The term "monoalkenyl arene" will be taken to include particularly those of the benzene series such as styrene and its analogs and homologs including alpha-methylstyrene and ring alkylated styrenes, particularly ring-methylated styrenes, and other monoalkenyl polycyclic aromatic compounds such as vinyl naphthalene and the like. The preferred monoalkenyl arenes are styrene and alpha-methylstyrene, and styrene is particularly preferred.

The blocks B may comprise homopolymers of conjugated diene monomers, copolymers of two or more conjugated dienes, and copolymers of one of the dienes with a monoalkenyl arene as long as the blocks B predominate in conjugated diene units. The conjugated dienes are preferably ones containing from 4 to 8 carbon atoms. Examples of suitable such conjugated diene monomers include: butadiene, isoprene, 2,3-dimethyl-1,3-butadiene, and piperylene, preferably butadiene and isoprene.

The blocks B may or may not be hydrogenated as taught, for example, in U.S. Pat. No. 3,700,633. This hydrogenation may be either partial or substantially complete. Selected conditions may he be employed for example to hydrogenate the blocks B while not so modifying the blocks A. Other conditions may be chosen to hydrogenate uniformly along the polymer chain, both blocks A and B thereof being hydrogenated to practically the same extent, which may be either partial or substantially complete.

The average molecular weights of the individual blocks may vary within certain limits. In most instances, the monoalkenyl arene blocks will have average molecular weights in the order of about 5,000 to about 125,000, preferably about 6,000 to about 60,000, while the conjugated diene blocks either before or after hydrogenation will have average molecular weights in the order of about 10,000 to about 300,000, preferably about 30,000 to about 150,000. The total average molecular weight of the multiblock copolymer is typically in the order of about 25,000 to about 350,000, preferably from about 35,000 to about 300,000. These molecular weights are most accurately determined by gel permeation chromatography.

The proportion of the monoalkenyl arene blocks should be between about 8 and about 65 percent by weight of the multiblock copolymer, preferably between about 10 and about 40 percent by weight.

The general type and preparation of these block copolymers are described in U.S. Pat. No. Re 28,246; 3,239,478; 3,427,269; and in many other U.S. and foreign patents. Typically, the first step of the polymerization process involves contacting the monoalkenyl arene and an organomonolithiun compound (initiator) in the presence of an inert diluent therein forming a living polymer compound having the simplified structure A-Li. The inert diluent may be an aromatic or naphthenic hydrocarbon e.g., benzene or cyclohexane, which may be modified by the presence of an alkene or alkane such as pentenes or pentanes. Specific examples of suitable diluents include n-pentane, n-hexane, isooctane, cyclohexane, toluene, benzene, xylene and the like. The organomonolithium compounds (initiators) that are reacted with the polymerizable additive in step one of this invention are represented by the formula RLi; wherein R is an aliphatic, cycloaliphatic, or aromatic radical, or combinations thereof, preferably containing from 1 to 20 carbon atoms per molecule. Exemplary of these organomonolithium compounds are ethyllithium, n-propyllithium, isopropyllithium, n-butyllithium, sec-butyllithium, tert-octyllithium, n-decyllithium, n-eicosyllithium, phenyllithium, 2-naphthyllithium, 4-butylphenyllithium, 4-tolyllithium, 4-phenylbutyllithium, cyclohexyllithium, 3,5-di-n-hepthylcyclohexyllithium, 4-cyclopentylbutyllithium, and the like. The alkyllithium compounds are preferred for employment according to this invention, especially those wherein the alkyl group contains from 3 to 10 carbon atoms. A much preferred initiator is sec-butyllithium. See U.S. Pat. No. 3,231,635. The concentration of the initiator can be regulated to control molecular weight. Generally, the initiator concentration is in the range of about 0.25 to 50 millimoles per 100 grams of monomer although both higher and lower initiator levels can be used if desired. The required initiator level frequently depends upon the solubility of the initiator in the hydrocarbon diluent. These polymerization reactions are usually carried out at a temperature in the range of about $-60°$ to about $+300°$ F. and at pressures which are sufficient to maintain the reaction mixture in the liquid phase.

Next, the living polymer in solution is contacted with a conjugated diene. Preferred dienes include butadiene and isoprene. The resulting living polymer has a simplified structure A—B—Li. It is at this point that the living polymer is coupled.

There are a wide variety of coupling agents that can be employed. Any polyfunctiional coupling agent which contains at least two reactive sites can be employed. Examples of the types of compounds which can be used include the polyepoxides, polyisocyanates, polyimines, polyaldehydes, polyketones, polyanhydrides, polyesters, polyhalides, and the like. These compound can contain two or more types of functional groups such as the combination of epoxy and aldehyde groups, isocyanate and halide groups, and the like. Various other substituents which are inert in the treating reaction can be present such as hydrocarbon radicals as exemplified by the alkyl, cycloalkyl, aryl, aralkyl and alkaryl groups and the alkoxy, aryloxy, alkylthio, arylthio, and tertiary amino groups. Many suitable types of these polyfunctional compounds have been described in U.S. Pat. Nos. 3,595,941; 3,468,972; 3,135,716; 3,078,254; and 3,594,452.

The block copolymer formed using these coupling agents has a simplified structure $(A-B)_n$—X where X is a residual group of a polyfunctional coupling agent having two or more functional groups which forms the nucleus (branching point) of the block copolymer and n is an integer of two or more. Typically, n ranges from 2 to about 40. Thus, when the coupling agent has two reactive sites such as a dibromoalkane (e.g. dibromoethane), the polymer will have a linear A-B-X-B-A structure. However, since X has no noticeable effect on the properties of the resulting block copolymer, the polymer is said to have a linear A-B-A structure. Furthermore, when the coupling agent has three or more reactive sites, such as silicon tetrachloride, the polymer will have a branched structure, such as $(A-B)_4$—Si.

As noted above, a portion of the coupling agent is incorporated as the nucleus of the block copolymer. The remainder of the coupling agent presumably reacts with the Li to form a coupling reaction by-product. In the case of polyhalide coupling agents, particularly where the halide is bromine, the by-product is a Br-containing compound. This Br-containing compound is suspected of causing the brown color formed during the molten aging of adhesive compositions comprising block copolymers which were prepared using bromine based coupling agents.

The typical coupling conditions include a temperature of between about 150° and about 170° F., and sufficient pressure to maintain the reactants in a liquid phase. Following the coupling reaction or when the desired coupling efficiency has been obtained, the product is neutralized such as by the addition of terminators, e.g. water, alcohol or other reagents, for the purpose of removing the lithium radical from the polymer product. The product is then recovered such as by coagulation utilizing hot water or steam or both.

B. Tackifying Resins

The block copolymer by itself is not sufficiently tacky or sticky. Therefore, it is necessary to add a tackifying resin that is compatible with the elastomeric conjugated diene block B and, optionally, to add one that is compatible with the monalkenyl arene block A. The tackifying resins useful in the adhesive compositions can be hydrocarbon resins, synthetic polyterpenes, rosin esters, natural terpenes, and the like. More particularly, the useful tackifying resins include any compatible resins or mixtures thereof such as (1) natural and modified rosins such, for example, as gum rosin, wood rosin, talloil rosin, distilled rosin, hydrogenated rosin, dimerized rosin, and polymerized rosin,; (2) glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic modified pentaerythritol ester of rosin; (3) copolymers and terpolymers of natural terpenes, e.g. styrene/terpene and alpha methyl styrene/terpene; (4) polyterpene resins having a softening point, as determined by ASTM method E28-58T, of from about 80° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins having a Ball and Ring softening point of from about 70° to 135° C.; the latter resins resulting from the polymerization of monomers consisting primarily of olefins and diolefins; also included are the hydrogenated aliphatic petroleum hydrocarbon resins; (7) aromatic petroleum hydrocarbon resins and the hydrogenated derivatives thereof; and (8) alicyclic petroleum hydrocarbon resins and the hydrogenated derivatives thereof. Mixtures of two or more of the above described tackifying resins may be preferable for some formulations.

The selection of the particular tackifying agent is, in large part, dependent upon the specific block copolymer employed in the respective adhesive composition. In the manufacture of disposable articles such as diapers, sanitary napkins and bed pads, there is the additional consideration of having a substantially white or clear adhesive composition.

C. Plasticizing Oil

Various plasticizing or extending oils may also be present in the adhesive composition in amounts of 0 to about 30 percent, preferably about 5 to about 25 percent, by weight in order to provide wetting action and/or viscosity control. The above broadly includes not only the usual plasticizing oils but also contemplates the use of olefin oligomers and low molecular weight polymers as well as vegetable and animal oil and their derivatives. The petroleum derived oils which may be employed are relatively high boiling materials containing only a minor proportion of aromatic hydrocarbons (preferably less than 30 percent and, more particularly, less than 15 percent by weight of the oil). Alternatively, the oil may be totally non-aromatic. The oligomers may be polypropylenes, polybutenes, hydrogenated polyisoprene, hydrogenated polybutadiene, or the like having average molecular weights between about 350 and about 10,000. Vegetable and animal oils include glyceryl esters of the usual fatty acids and polymerization products thereof.

D. Petroleum Derived Waxes

Various petroleum derived waxes may also be present in the adhesive composition in amounts of 0 to about 15 percent by weight of the composition in order to impart fluidity in the molten condition of the adhesive and flexibility to the set adhesive, and to serve as a wetting agent for bonding cellulosic fibers. The term "petroleum derived wax" includes both paraffin and microcrystalline waxes having melting points within the range of about 130° to about 225° F. as well as synthetic waxes such as low molecular weight polyethylene or Fisher-Tropsch waxes.

E. Stabilizers

An essential component of the present invention is a synergistic combination of stabilizers which inhibits or retards heat degradation, oxidation, skin formation and color formation. Stabilizers are typically added to the commercially available compounds in order to protect the polymers against heat degradation and oxidation during the preparation, use and high temperature storage of the adhesive composition.

However, a skin tends to form on the air exposed surface of the adhesive which has not been stabilized with respect to skin and color formation (unstabilized adhesive composition) during high temperature storage and repeated remelting and cooling. Furthermore, hot melt adhesives based on block copolymers prepared utilizing bromide based coupling agents develop color at this stage in the form of an incipient yellowing which gradually darkens to a dark brown color. In this regard, a four component stabilizer package has been found which in addition to protecting the unstabilized adhesive composition against heat degradation and oxidation provides remarkable resistance to skin and color development. The components of this synergistic stabilizer package consists essentially of:

(1) a thio compound, specifically, 2,4-bis-(n-octylthio)-6-(4-hydroxy-3,5-di-tertiary-butyl anilino)-1,3,5-triazine;
(2) a phenolic antioxidant;
(3) a tris-(nonylated phenyl) phosphite; and
(4) an aliphatic compatible epoxy compound.

The primary effect of the thio compound is to inhibit or retard skin formation of the adhesive upon molten heat aging. The primary effect of the epoxy compound is to act as a halide scavenger. However, all four components provide a synergistic effect with respect to both skin and color formation.

The thio compound is generally present in an amount of about 0.03 to about 2.0 parts per hundred parts of unstabilized adhesive composition (phua), preferably in an amount of about 0.05 to about 0.5 phua.

Phenolic antioxidants are well known to those skilled in the art and may be characterized as phenolic compounds which also contain sterically bulky groups in close proximity to the phenolic hydroxyl group thereof. In particular, tertiary butyl groups generally are substituted onto the benzene ring in at least one of the ortho positions relative to the phenolic hydroxy group. Representative phenolic antioxidants include:

2,6-di-tertiary-butyl phenol;
2,6-di-tertiary-butyl-4-methyl phenol;
tetrakis - [methylene-(3,5-di-tertiary-butyl-4-hydroxyhydrocinnamate)] methane;
1,3,5-tri-methyl-2,4,6-tris-(3,5-di-tertiary-butyl-4-hydroxy-benzyl) benzene;
pentaerythrityl tetrakis-[3-(3,5-di-tertiary-butyl4-hydroxy phenyl) propionate];
n-octadecyl-3-(3,5-di-tertiary-butyl-4-hydroxyphenyl) propionate;
4,4'-methylene-bis-(2,6-di-tertiary-butyl-phenol);
4,4'-thio-bis-(6-tertiary-butyl-o-cresol);
2,4-bis-(n-octylthio)-6-(4-hydroxy-phenoxy)-1,3,5-triazine;
di-n-octadecyl-3,5-di-tertiary-butyl-4-hydroxybenzyl-phosphonate;
2-(n-octylthio) ethyl-3,5-di-tertiary-butyl-4-hydroxybenzoate; and
sorbitol hexa-[3-(3,5-di-tertiary-butyl-4-hydroxy phenyl) propionate].

These phenolic antioxidants are generally present singly or in combination of two or more of these in a total amount of about 0.15 to about 5.0 phua, preferably in an amount of about 0.2 to about 1.0 phua.

Tris-(nonylated phenyl) phosphites are known compounds which are sold commercially as stabilizer-antioxidants for the prevention of oxidative degradation of polymers, under a variety of trade names, e.g., Polygard ®, Naugard ®, Antigene TNP ®, Anullex TNPP ®, Irgaphos TNPP ®, AND Nocrac TNP ®. The preferred of these being Polygard ® which is described as being a tri(mixed mono- and di-nonylphenyl) phosphite (Polygard Technical Bulletin No. 15; Mar. 1964, ex Uniroyal). These phosphites are generally present singly or in combination of two or more in a total amount of about 0.13 to about 5.0 phua, preferably in an amount of about 0.2 to about 1.0 phua.

Aliphatic compatible epoxy compounds are known compounds and their use as halide scavengers is well known. Their effectiveness as halide scavengers is believed to be due to a reacton such as the following:

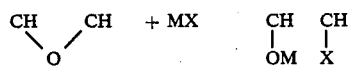

where M is a cation and X is a halide, such as bromide (Br). In the present invention, the epoxy compounds are believed to bind the Br from the coupling reaction by-product compound. The binding of the bromide in this fashion is believed to impart color stability, i.e. a Gardner Color number of 6 or less, to the adhesive composition. The aliphatic compatibility of the epoxy compound aids the miscibility of same in the adhesive composition, thereby improving the efficiency of the bromide binding reaction by increasing the probability of contact between the epoxide and the coupling reaction by-product.

Representative aliphatic compatible epoxy compounds are the epoxidized oils such as epoxidized soybean oil, epoxidized castor oil, epoxidized linseed oil, and epoxidized sunflower oil. The epoxidized oils either singly or a mixture thereof are generally present in an amount of about 0.30 percent to about 5.0 phua, preferably in an amount of about 0.4 percent to about 1.0 phua.

Additional stabilizers known in the art may also be incorporated into the adhesive composition. These may be for protection during the life of the disposable article against, for example, oxygen, ozone and ultra-violet radiation. However, these additional stabilizers should be compatible with the essential stabilizers mentioned herein-above and their intended function as taught herein.

G. Preparation and Use

The adhesive compositions of the present invention are typically prepared by blending the components at an elevated temperature, preferably between about 130° C. and about 200° C., until a homogeneous blend is obtained, usually less than three (3) hours. Various methods of blending are known to the art and any method that produces a homogeneous blend is satisfactory.

The resultant adhesives may then preferably be used in a wide variety of product assembly applications. A particularly preferred application is their use in bonding polyethylene or polypropylene substrates to tissue, non-wovens or other polyethylene or polypropylene substrates using techniques involving multiple dispositions of small quantities of the adhesives according to conventional "multi-line" or "multi-dot" type constructions. Although the procedures used to manufacture these disposable constructions vary depending upon the particular manufacturer, the adhesive is generally extruded in lines (or dots) at regularly spaced intervals along the length of the article. The adhesive is usually applied to the polyethylene or polypropylene backing and subsequently the combination is mated with an absorbent inner core and tissue or non-woven liner.

This invention can be further illustrated by the following examples of preferred embodiments thereof, although it will be understood that these examples are included merely for purposes of illustration and are not intended to limit the scope of the invention unless otherwise specifically indicated.

In the embodiments and examples the following materials were employed:

(a) Block Copolymers:
  BC-I; an SBS polymer from Shell Chemical Co. prepared using a bromide based coupling agent and having a general structure of $(S-B)_2-X$ with a typical number average molecular weight of about 67,000 and a styrene content of about 30 percent.
  BC-II; an SIS polymer from Shell Chemical Co. prepared using a bromide based coupling agent and having a general structure of $(S-I)_2-X$ with a typical number average molecular weight of about 150,000 and a styrene content of about 15 percent.
  BC-III; an SBS polymer from Shell Chemical Co. prepared using a chloride based coupling agent and having a general structure of $(S-B_{\geq 3.2}-X$ with a typical number average molecular weight of about 105,000 and a styrene content of about 39 percent.
  BC-IV; an SIS polymer from Shell Chemical Co. prepared using an alkenyl arene based coupling agent and having a general structure of $(S-I)_8-X$ with a typical number average molecular weight of about 600,000 and a styrene content of about 11 percent.
  BC-V; an S-EB-S polymer from Shell Chemical Co. prepared using an ester based coupling agent and having a general structure of $(S-EB)_2-X$ with a typical number average molecular weight of about 82,000 and a styrene content of about 13 percent.
  BC-VI; an S-B-S-B-S polymer from Firestone (Stereon ® 840A) believed to be sequentially formed. (57 parts butadiene and 43 parts styrene). See U.S. Pat. No. 4,526,577.

(b) Tackifying Resin:
  Escorez ® 5300; a mid-block (block B) compatible, hydrogenated resin from EXXON.

(c) Plasticizing Oil:
  Tufflo ® 6056; a mid-block (block B) compatible, hydrocarbon extending oil from ARCO.

(d) Stabilizers:
  Irganox ® 565; a thio compound from Ciba Geigy having the formula 2,4-bis-(n-octylthio)-6-(4-hydroxy-3,5-di-tertiary-butyl anilino)-1,3,5-triazine.
  Ionol ®; a phenolic antioxidant from Shell International having the formula 2,6-di-tertiary-butyl-4-methyl phenol.
  Irganox ® 1010; a phenolic antioxidant from Ciba Geigy, covered by U.S. Pat. Nos. 3,285,855 and 3,644,482, having the formula tetrakis-[methylene-(3,5-di-tertiary-butyl-4-hydroxyhydrocinnamate)] methane.
  Irganox ® 1330; a phenolic antioxidant from Ciba Geigy having the formula 1,3,5-trimethyl-2,4,6 -tris-3′,5′-di-tertiary-butyl-4′-hydroxy benzyl) benzene.
  Irgaphos ® 168; a phosphite from Ciba Geigy having the formula tris-(2,4-di-tertiary-butyl-phenyl) phosphite.
  Polygard ® HR; a tris-(nonylated phenyl)phosphite from Uniroyal, Naugatuck Chemical Division, U.S.A., described as being a tris-(mixed mono-and di-nonylphenyl) phosphite (Polygard Technical Bulletin No. 15; Mar. 1964, ex Uniroyal).
  Ultranox ® 626; a phosphite from Borg-Warner having the formula bis(2,4-di-tertiary butyl phenyl) pentaerithritol diphosphite.
  Araldite ® GY 6010; an aromatic epoxy resin from Ciba Geigy, a diglycidyl ether of Bisphenol A.
  Drapex ® 6.8; an epoxidized soybean oil from Witco.
  Epon ® 2004; an aromatic epoxy resin from Shell Chemical Co., a diglycidyl ether of Bisphenol A/epichlorohydrin oligomer.

Adhesive compositions were prepared according to the formulations in Table I. Each adhesive composition was mixed in a sigma blade mixer for about one(1) hour under a nitrogen blanket. Two samples of each hot melt adhesive composition were prepared for aging by placing 100 grams of the adhesive into 200ml glass beakers and covering the beakers with aluminum foil. The beakers were placed in an air draft over at 177° C. and one beaker was removed after 24 and 48 hours aging, respectively. As each beaker was removed from the oven, a spatula was used to immediately probe the surface of the adhesive to test qualitatively for the presence of a skin on the adhesive. The adhesive was then each assigned a skin rating as follows: 0-none; 1-slight; 2-moderate; and 3-heavy. The skin rating should be 0 so as to avoid problems with the applicator equipment.

The adhesive was then gently stirred to homogenize it and a Gardner color tube was filled to allow color measurement. The Gardner Color scale is manufactured by Gardner Laboratory, Inc. in Bethesda, Maryland and is composed of 18 sealed vials each containing a color standard liquid which is clear at 1 and progresses to a translucent dark brown color at 18. The Gardner color tube containing the sample was then assigned a Gardner color number between 1 to 18 by comparing the sample to the standards. For the hot melt adhesive of the present invention, the Gardner color number should be 6 or less.

EXAMPLES 1-12

Color Source

To test whether the coupling reaction by-product, a Br-containing compound, could cause an unacceptable level of color development in an adhesive (i.e., a Gardner color number greater than 6), BC-II and BC-VI were tested in like adhesive formulations. Gel permeation chromatography analyses suggest these two polymers are polymerized in solvent using an alkyl lithium catalyst. However, BC-VI (STEREON 840A) appears to have been polymerized sequentially while BC-II is made by a coupling process utilizing a bromide based coupling agent. Examples 10 and 11 in Table II show that the BC-II hot melt adhesive turns brown (Gardner Color No.=11) while the BC-VI hot melt adhesive only turns yellow (Gardner Color No.=6) in this formulation after molten aging for 24 hours at 177° C. Example 12 shows that merely adding 0.25 percent by weight of ground LiBr to the BC-VI hot melt adhesive during mixing caused the brown color (Gardner Color No.=12) to form after molten aging for 24 hours at 177° C.

To further test whether the presence of the coupling reaction by-product, Br-containing compound, causes the brown color, adhesives using polymers prepared using bromide based coupling agents, non-bromide based coupling agents, and BC-VI were prepared and molten aged. The adhesives using polymers prepared using bromide based coupling agents developed the unacceptable brown color during the 48-hour molten aging test at 177° C. See results of Example 1-3 (BC-II) and Example 4 (BC-I) in Table II. The adhesives using polymers prepared without the aid of bromide based coupling agents did not develop the brown color during this test. See results of Example 5 (BC-III), Example 6 (BC-IV), Example 7 (BC-V) and Example 8 and 9 (BC-VI), in Table II.

Though these tests are not conclusive, these tests do evidence a cause and effect relationship between the brominated coupling reaction by-product in a polymer and the development of an unacceptable brown color in a hot melt adhesive based on such a polymer.

EXAMPLES 13-17

Antioxidant Phenols

The results of Examples 13 through 17 in Table II show that the type of phenolic antioxidant used in the hot melt adhesive has little impact on the melt aging characteristics of the hot melt adhesive. The phenolic antioxidants utilized herein were Ionol, Irganox 1010 and Irganox 1330.

EXAMPLES 13,14,16,18 and 19

Epoxys

The results of Examples 13,14,16,18 and 19 in Table II show the effect of different epoxy compounds in the additive package formulations. Examples 13 and 16 are embodiments of the present invention and illustrate the superiority of Drapex 6.8 over Araldite GY 6010 and Epon 2004 used in Examples 14, 18 and 19. The key distinction between these epoxy compounds is that Araldite GY 6010 and Epon 2004 are both aromatic epoxy compounds and Drapex 6.8 is a non-aromatic epoxy compound; or, more precisely, an aliphatic compatible epoxy compound. The aromatic epoxy compounds tend to be insoluble in the hot melt adhesive composition rendering them less effective than the epoxy compounds which are aliphatically compatible.

EXAMPLES 18,20 and 21

Phosphites

The results of Examples 18, 20 and 21 in Table II show the effect of different phosphites while maintaining the other components of the additive package constant. Example 18 clearly illustrates the superiority of Polygard HR over Irgaphos 168 and Ultranox 626. The key distinction between these phosphites is that Polygard HR is a tris-(nonylated phenyl) phosphite.

EXAMPLES 18 and 22

Thio Compound

The formulation of Example 22 is like that of Example 18 minus the thio compound Iragnox 565. The results of these examples as shown in Table II illustrate the skin inhibiting or retarding role that the thio compound Irganox 565 plays.

EXAMPLES 15, 16 and 23-25

Sensitivity

The formulations of Examples 15, 16 and 23-25 illustrate in Table II the sensitivity or effectiveness of various component concentrations in the additive package, thereby establishing a minimum effective amount for each component in the additive package (Example 25). As for a maximum effective amount, Examples 16, 23 and 24, embodiments of the present invention, indicate that excess amounts of these components are not deleterious to the adhesive nor is any further substantial improvement seen. Thus, upper limits on these additive package components are set by other practical and cost effective considerations.

TABLE I

| EXAMPLE | SAMPLE NO. | UNSTABILIZED ADHESIVE POLYMER | FORMULATION (a) | PHENOLIC PHUA | STABILIZER | THIO PHUA | STABILIZER | PHOSPHITE PHUA | STABILIZER | EPOXY PHUA | STABILIZER |
|---|---|---|---|---|---|---|---|---|---|---|---|
| 1 | 1841-1 | BC-II | A | 0.5 | IONOL | | | | | | |

TABLE I-continued

| | | | | | | | | | | | |
|---|---|---|---|---|---|---|---|---|---|---|---|
| 2 | 1827-5 | BC-II | A | 0.5 | IRG.1010 | | | | | | |
| 3 | 1832-1 | BC-II | A | 0.5 | IRG.1330 | | | | | | |
| 4 | 1983-3 | BC-I | A | 0.5 | IONOL | | | | | | |
| 5 | 1827-10 | BC-III | A | 0.5 | IRG.1010 | | | | | | |
| 6 | 1832-9 | BC-IV | A | 0.5 | IRG.1330 | | | | | | |
| 7 | 1832-10 | BC-V | A | 0.5 | IRG.1330 | | | | | | |
| 8 | 1983-5 | BC-VI | A | 0.5 | IONOL | | | | | | |
| 9 | 1827-9 | BC-VI | A | 0.5 | IRG.1010 | | | | | | |
| 10 | 1770-2 | BC-II | C | 0.5 | IRG.1010 | | | | | | |
| 11 | 1770-1 | BC-VI | C | 0.5 | IRG.1010 | | | | | | |
| 12 | 1770-10 | BC-VI (d) | C | 0.5 | IRG.1010 | | | | | | |
| 13 * | 1866-10 | BC-I | A | 0.2 | IONOL | 0.05 | IRG.565 | 0.25 | PG | 0.5 | DRAPEX |
| 14 | 1832-8 | BC-I | A | 0.2 | IRG.1330 | 0.05 | IRG.565 | 0.25 | PG | 0.5 | ARALD |
| 15 * | 1866-5 | BC-II | A | 0.2 | IONOL | 0.05 | IRG.565 | 0.25 | PG | 0.5 | DRAPEX |
| 16 * | 1841-6 | BC-II | A | 0.2 | IRG.1330 | 0.05 | IRG.565 | 0.25 | PG | 0.5 | DRAPEX |
| 17 | 1827-1 | BC-II | A | 0.2 | IRG.1010 | 0.05 | IRG.565 | 0.25 | PG | 0.5 | ARALD |
| 18 | 1832-2 | BC-II | A | 0.2 | IRG.1330 | 0.05 | IRG.565 | 0.25 | PG | 0.5 | ARALD |
| 19 | 1841-7 | BC-II | A | 0.2 | IRG.1330 | 0.05 | IRG.565 | 0.25 | PG | 0.5 | EPON |
| 20 | 1841-4 | BC-II | A | 0.2 | IRG.1330 | 0.05 | IRG.565 | 0.25 | IRG.168 | 0.5 | ARALD |
| 21 | 1841-5 | BC-II | A | 0.2 | IRG.1330 | 0.05 | IRG.565 | 0.25 | ULNX | 0.5 | ARALD |
| 22 | 1832-3 | BC-II | A | 0.2 | IRG.1330 | — | — | 0.25 | PG | 0.5 | ARALD |
| 23 * | 1841-8 | BC-II | A | 0.2 | IRG.1330 | 0.1 | IRG.565 | 0.25 | PG | 0.5 | DRAPEX |
| 24 * | 1841-9 | BC-II | A | 0.5 | IRG.1330 | 0.1 | IRG.565 | 0.25 | PG | 0.5 | DRAPEX |
| 25 | 1866-4 | BC-II | A | 0.1 | IONOL | .025 | IRG.565 | .125 | PG | .25 | DRAPEX |

* WITHIN SCOPE OF PRESENT INVENTION
(a) FORMULATION, % WT.

| | A | C |
|---|---|---|
| POLYMER | 25 | 20 |
| ESCOREZ 5300 | 60 | 60 |
| TUFFLO 6056 | 15 | 20 |

(b) PHUA — PARTS PER HUNDRED PARTS OF UNSTABILIZED ADHESIVE COMPOSITION
(c) IRG.1010 = IRGANOX 1010
  IRG.1330 = IRGANOX 1330
  IRG.565 = IRGANOX 565
  IRG.168 = IRGAPHOS 168
  ULNX = ULTRANOX 626
  ARALD = ARALDITE GY 6010
  EPON = EPON 2004
  DRAPEX = DRAPEX 6.8
  PG = POLYGARD HR
(d) BC-VI PLUS 0.25% WT. LiBr

TABLE II

| EXAMPLE | GARDNER COLOR NUMBER | | | SKIN RATING (A) | |
|---|---|---|---|---|---|
| | UNAGED | 24 HR. | 48 HR. | 24 HR. | 48 HR. |
| 1 | 6 | 7 | 10 | 0 | 0 |
| 2 | 3 | 7 | 10 | 0 | 0 |
| 3 | 3 | 7 | 10 | 0 | 0 |
| 4 | 3 | 7 | 12 | 0 | 0 |
| 5 | 2 | 4 | 6 | 0 | 0 |
| 6 | 2 | 3 | 3 | 0 | 0 |
| 7 | 2 | 3 | 4 | 0 | 0 |
| 8 | 3 | 3 | 4 | 0 | 1 |
| 9 | 1 | 6 | 6 | 0 | 1 |
| 10 | 3 | 11 | — | — | — |
| 11 | 3 | 6 | — | — | — |
| 12 | — | 12 | — | — | — |
| 13* | 3 | 4 | 6 | 0 | 0 |
| 14 | 3 | 5 | 7 | 0 | 1 |
| 15* | 2 | 5 | 6 | 0 | 0 |
| 16* | 3 | 5 | 5 | 0 | 0 |
| 17 | 4 | 5 | 7 | 0 | 1 |
| 18 | 3 | 6 | 7 | 0 | 1 |
| 19 | 3 | 9 | 11 | 1 | 2 |
| 20 | 6 | 10 | 12 | 0 | 1 |
| 21 | 5 | 8 | 8 | 0 | 0 |
| 22 | 5 | 6 | 8 | 1 | 1 |
| 23* | 3 | 4 | 5 | 0 | 0 |
| 24* | 3 | 4 | 5 | 0 | 0 |
| 25 | 3 | 5 | 7 | 0 | 1 |

*WITHIN SCOPE OF PRESENT INVENTION
(A) SKIN RATING:
0 = NONE
1 = SLIGHT
2 = MEDIUM
3 = HEAVY

What is claimed is:

1. A hot melt adhesive composition which is color stable and resistant to heat degradation, oxidation and skin formation comprising:
  (a) 100 parts of an unstabilized adhesive composition, said unstabilized adhesive composition comprising:
    (1) about 15 to about 35 percent by weight of a block copolymer, said block copolymer being prepared utilizing a bromide based coupling agent, said block copolymer comprising at least two monoalkenyl arene polymer end blocks A and at least one elastomeric conjugated diene polymer mid block B, and said block copolymer having about 8 to about 65 percent by weight of said monoalkenyl arene polymer block content, each polymer block A having an average molecular weight of between about 5,000 and about 125,000, and each polymer block B having an average molecular weight of between about 10,000 and about 300,000,
    (2) about 45 to about 70 percent by weight of a compatible tackifying resin,
    (3) 0 to about 30 percent by weight of a plasticizing oil, and
    (4) 0 to about 15 percent of a petroleum derived wax; and
  (b) an effective amount of a stabilizer composition, said effective amount consisting essentially of:
    (1) from about 0.03 to about 2.0 parts per hundred parts of said unstablized adhesive composition (phua) of a thio compound, said thio compound being 2,4-bis-(n-octylthio)-6-(4-hydroxy-3,-5-di-tertiary-butyl anilino)-1,3,5-triazine,
(2) from about 0.15 to about 5.0 phua of a phenolic antioxidant,
(3) from about 0.13 to about 5.0 phua of a tris-(nonylated phenyl) phosphite, and
(4) from about 0.30 to about 5.0 phua of an aliphatic compatible epoxy compound.

2. A composition according to claim 1 wherein said block copolymer monoalkenyl arene is styrene and said block copolymer conjugated diene is selected from isoprene and butadiene.

3. A composition according to claim 1 wherein said block copolymer has a simplified structure of (A-B)$_n$—X, wherein X is a residual group of said bromide based coupling agent having two or more functional bromide groups, said X forming the nucleus of said block copolymer, and n is an integer of 2 to about 40.

4. A composition according to claim 1 wherein said block copolymer has an A-B-A linear structure.

5. A composition according to claim 1 wherein said block copolymer is a selectively hydrogenated block copolymer of styrene and butadiene, said butadiene having a 1,2 content of between about 35 percent and about 55 percent.

6. A composition according to claim 1 wherein said tackyifying resin is any compatible resin or mixture thereof selected from the group consisting of (1) natural and modified rosins; (2) glycerol and pentaerythritol esters of natural and modified rosins; (3) copolymers and terpolymers of natural terpenes; (4) polyterpene resins having a softening point, as determined by ASTM method E28-58T, of from about 80° C. to about 150° C.; (5) phenolic modified terpene resins and hydrogenated derivatives thereof; (6) aliphatic petroleum hydrocarbon resins having a Ball and Ring softening point of from about 70° C. to about 135° C.; (7) aromatic petroleum hydrocarbon resins and the hydrogenated derivatives thereof; and (8) alicyclic petroleum hydrocarbon resins and the hydrogenated derivatives thereof.

7. A composition according to claim 1 wherein said phenolic antioxidant is any phenolic antioxidant or mixture thereof selected from the group consisting of:
2,6-di-tertiary-butyl phenol;
2,6-di-tertiary-butyl-4-methyl phenol;
tetrakis-[methylene-(3,5-di-tertiary-butyl-4-hydroxyhydrocinnamate)] methane;
1,3,5-tri-methyl-2,4,6-tris-(3,5-di-tertiary-butyl-4-hydroxy-benzyl) benzene;
pentaerythrityl tetrakis-[3,5-di-tertiary-butyl-4-hydroxy phenyl) propionate];
n-octadecyl-3-(3,5-di-tertiary-butyl-4-hydroxyphenyl) propionate;
4,4'-methylene-bis-(2,6-di-tertiary-butyl-phenol);
4,4'-thio-bis-(6-tertiary-butyl-o-cresol);
2,4-bis-(n-octylthio)-6-(4-hydroxy-phenoxy)-1,3,5-triazine;
di-n-octadecyl-3,5-di-tertiary-butyl-4-hydroxybenzyl-phosphonate;
2-(n-octylthio) ethyl-3,5-di-tertiary-butyl-4-hydroxybenzoate; and
sorbitol hexa-[3-(3,5-di-tertiary-butyl-4-hydroxy phenyl) propionate].

8. A composition according to claim 1 wherein said phenolic antioxidant is 2,6-di-tertiary-butyl-4-methyl phenol.

9. A composition according to claim 1 wherein said phenolic antioxidant is tetrakis - [methylene-(3,5-di-tertiary-butyl-4-hydroxy-hydrocinnamate)] methane.

10. A composition according to claim 1 wherein said phenolic antioxidant is 1,3,5-tri-methyl-2,4,6-tris-(3,5-di-tertiary-butyl-4-hydroxy-benzyl) benzene.

11. A composition according to claim 1 wherein said tris-(nonylated phenyl) phosphite is a tri(mixed mono- and di-nonyl-phenyl) phosphite.

12. A composition according to claim 1 wherein said aliphatic compatible epoxy compound is any epoxy compound or mixture thereof selected from the group consisting of: epoxidized soybean oil, epoxidized castor oil, epoxidized linseed oil, and epoxidized sunflower oil.

13. A composition according to claim 1 wherein said aliphatic compatible epoxy compound is epoxidized soybean oil.

14. A composition according to claim 1 wherein said bromide coupling agent is a dibromoalkane.

15. A stablizer composition for use in hot melt adhesive compositions so as to impart color stability and resistance to heat degradation, oxidation and skin formation to an unstabilized adhesive composition, said unstabilized adhesive composition utilizing block copolymers prepared using bromide based coupling agents, said stabilizer composition consisting essentially of:
(a) from about 0.03 to about 2.0 parts per hundred parts of said unstabilized adhesive composition (phua) of a thio compound, said thio compound being 2,4-bis-(n-octylthio)-6-(4-hydroxy-3,5-di-tertiary-butyl anilino)-1,3,5-triazine;
(b) from about 0.15 to about 5.0 phua of a phenolic antioxidant;
(c) from about 0.13 to about 5.0 phua of a tris-(nonylated phenyl) phosphite; and
(d) from about 0.30 to about 5.0 phua of an aliphatic compatible epoxy compound.

16. A composition according to claim 15 wherein said phenolic antioxidant is any phenolic antioxidant or mixture thereof selected from the group consisting of:
2,6-di-tertiary-butyl phenol;
2,6-di-tertiary-butyl-4-methyl phenol;
tetrakis-[methylene-(3,5-di-tertiary-butyl-4-hydroxyhydrocinnamate)] methane;
1,3,5-tri-methyl-2,4,6-tris-(3,5-di-tertiary-butyl-4-hydroxy-benzyl) benzene;
pentaerythrityl tetrakis-[3-(3,5-di-tertiary-butyl-4-hydroxy phenyl) propionate];
n-octadecyl-3-(3,5-di-tertiary-butyl-4-hydroxy-phenyl) propionate;
4,4'-methylene-bis-(2,6-di-tertiary-butyl-phenol);
4,4'-thio bis-(6-tertiary-butyl-o-cresol);
2,4-bis-(n-octylthio)-6-(4-hydroxy-phenoxy)-1,3,5-triazine;
di-n-octadecyl-3,5-di-tertiary-butyl-4-hydroxy-benzylphosphonate;
2-(n-octylthio) ethyl-3,5-di-tertiary-butyl-4-hydroxybenzoate; and
sorbitol hexa-[3-(3,5-di-tertiary-butyl-4-hydroxy phenyl) propionate].

17. A composition according to claim 15 wherein said phenolic antioxidant is 2,6-di-tertiary-butyl-4-methyl phenol.

18. A composition according to claim 15 wherein said phenolic antioxidant is tetrakis-[methylene-(3,5-di-tertiary-butyl-4-hydroxy-hydrocinnamate)] methane.

19. A composition according to claim 15 wherein said phenolic antioxidant is 1,3,5-tri-methyl-2,4,6-tris-(3,5-di-tertiary-butyl-4-hydroxy-benzyl) benzene.

20. A composition according to claim 15 wherein said tris-(nonylated phenyl) phosphite is a tri(mixed mono- and di-nonyl-phenyl) phosphite.

* * * * *